(12) United States Patent
Sasaki

(10) Patent No.: US 8,648,564 B2
(45) Date of Patent: Feb. 11, 2014

(54) POWER TRANSMITTING DEVICE

(75) Inventor: Kenichi Sasaki, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/608,033

(22) Filed: Sep. 10, 2012

(65) Prior Publication Data
US 2013/0313910 A1 Nov. 28, 2013

(30) Foreign Application Priority Data
May 23, 2012 (JP) ................................. 2012-117653

(51) Int. Cl.
*H02J 7/00* (2006.01)
*H01F 38/14* (2006.01)

(52) U.S. Cl.
USPC .......................................... 320/108; 307/104

(58) Field of Classification Search
USPC .......................................... 320/108; 307/104
See application file for complete search history.

(56) References Cited

U.S. PATENT DOCUMENTS

| | | | |
|---|---|---|---|
| 6,635,818 B2 | 10/2003 | Ichiki et al. | |
| 7,279,807 B2 * | 10/2007 | Konno | ......................... 307/10.5 |
| 7,710,288 B2 * | 5/2010 | Seguchi et al. | ............ 340/686.4 |
| 2004/0260470 A1 * | 12/2004 | Rast | ............................... 701/300 |
| 2010/0231163 A1 * | 9/2010 | Mashinsky | ..................... 320/108 |
| 2011/0115303 A1 * | 5/2011 | Baarman et al. | .............. 307/104 |
| 2012/0112543 A1 * | 5/2012 | van Wageningen et al. | .... 307/43 |

FOREIGN PATENT DOCUMENTS

| | | |
|---|---|---|
| JP | 2002-78360 | 3/2002 |
| JP | 2002-84688 | 3/2002 |
| JP | 2002-142388 | 5/2002 |
| JP | 2011-83067 | 4/2011 |

* cited by examiner

*Primary Examiner* — M'Baye Diao
(74) *Attorney, Agent, or Firm* — Oblon, Spivak, McClelland, Maier & Neustadt, L.L.P.

(57) ABSTRACT

According to an embodiment, a power transmitting device includes a power supply unit, a power transmitting coil, a first switch, a piezoelectric element, and a first switch controller. The power supply unit is configured to generate a transmission power by using power supplied to a power input terminal. Once the first switch is turned on, the first switch electrically connects an external power supply and the power input terminal until the first switch is turned off next time. The piezoelectric element is disposed at a position at which a weight of a placed power receiving device can be detected. The piezoelectric element is configured to generate a detection power according to the weight of the placed power receiving device. The first switch controller is configured to generate a starting power by the detection power and switches the first switch to on by using the starting power.

17 Claims, 2 Drawing Sheets

POWER TRANSMITTING DEVICE

CROSS REFERENCE TO RELATED APPLICATION

This application is based upon and claims the benefit of priority from the prior Japanese Patent Application No. 2012-117653 filed on May 23, 2012 in Japan, the entire contents of which are incorporated herein by reference.

FIELD

Embodiments described herein relate generally to a power transmitting device.

BACKGROUND

A power transmitting device (a charging platform) which wirelessly supplies electric power to a power receiving device by using electromagnetic induction is known. Examples of the power receiving device include a mobile phone. A user can charge a built-in battery of the power receiving device by wirelessly transmitted power only when placing the power receiving device on the power transmitting device. The power transmitting device is connected to a commercial power supply at all times so that the power receiving device can be charged at any time when the power receiving device is placed on the power transmitting device.

For the purpose of reducing power consumption, the power transmitting device transmits charging power when the power receiving device is located nearby and the power transmitting device does not transmit charging power when the power receiving device is not located nearby. For this purpose, for example, the power transmitting device transmits a PING signal at a certain time interval and checks whether or not the power receiving device is located nearby by the presence or absence of a response from the power receiving device. Therefore, the power transmitting device requires standby power of several mW to check the presence of the power receiving device even in a standby state where the power receiving device is not located nearby.

DETAILED DESCRIPTION

According to an embodiment, a power transmitting device includes a power supply unit, a power transmitting coil, a first switch, a piezoelectric element, and a first switch controller. A power receiving device can be placed on the power transmitting device. The power receiving device charges a built-in battery by using wirelessly received power. The power supply unit includes a power input terminal. The power supply unit is configured to generate a transmission power by using power supplied to the power input terminal. The power transmitting coil is configured to wirelessly transmit the transmission power to the power receiving device. Once the first switch is turned on by receiving a switch-on control, the first switch electrically connects an external power supply and the power input terminal until the first switch is turned off next time by receiving a switch-off control. Once the first switch is turned off by receiving the switch-off control, the first switch electrically disconnects the external power supply and the power input terminal until the first switch is turned on next time by receiving the switch-on control. The piezoelectric element is disposed at a position at which a weight of the placed power receiving device can be detected. The piezoelectric element is configured to generate a detection power according to the weight of the placed power receiving device. The first switch controller is configured to generate a starting power by the detection power and switches the first switch to on by using the starting power.

Hereinafter, an embodiment of the present invention will be described with reference to the drawings. The embodiment does not limit the present invention.

Figure 1:
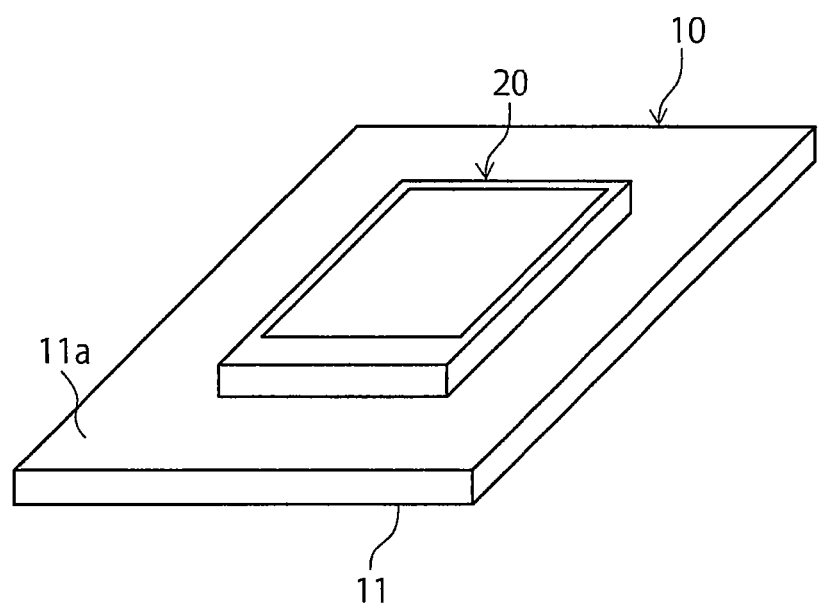
FIG. 1 is a perspective view schematically showing an external shape of a power transmitting device and a power receiving device according to an embodiment.

FIG. 1 is a perspective view schematically showing an external shape of a power transmitting device 10 and a power receiving device 20 according to an embodiment. As shown in FIG. 1, the power transmitting device 10 includes a flat-plate-shaped housing 11. The housing 11 includes an upper surface (a placing portion) 11a on which the power receiving device 20 can be placed. The power receiving device 20 is placed on the upper surface 11a of the housing 11 of the power transmitting device 10.

The power transmitting device 10 wirelessly transmits power to the power receiving device 20 from the side of the upper surface 11a of the housing 11 by using electromagnetic induction. The power receiving device 20 includes a power receiving coil and a built-in battery. The power receiving device 20 charges the built-in battery by using power wirelessly received by the power receiving coil. The power receiving device 20 is a mobile device such as, for example, a mobile phone, a game console, and a camera and operates by power of a built-in battery. In this way, the power transmitting device 10 functions as a charging platform.

The power transmitting device 10 transmits power and the power receiving device 20 receives power in compliance with, for example, a standard of Wireless Power Consortium (WPC).

Figure 2:
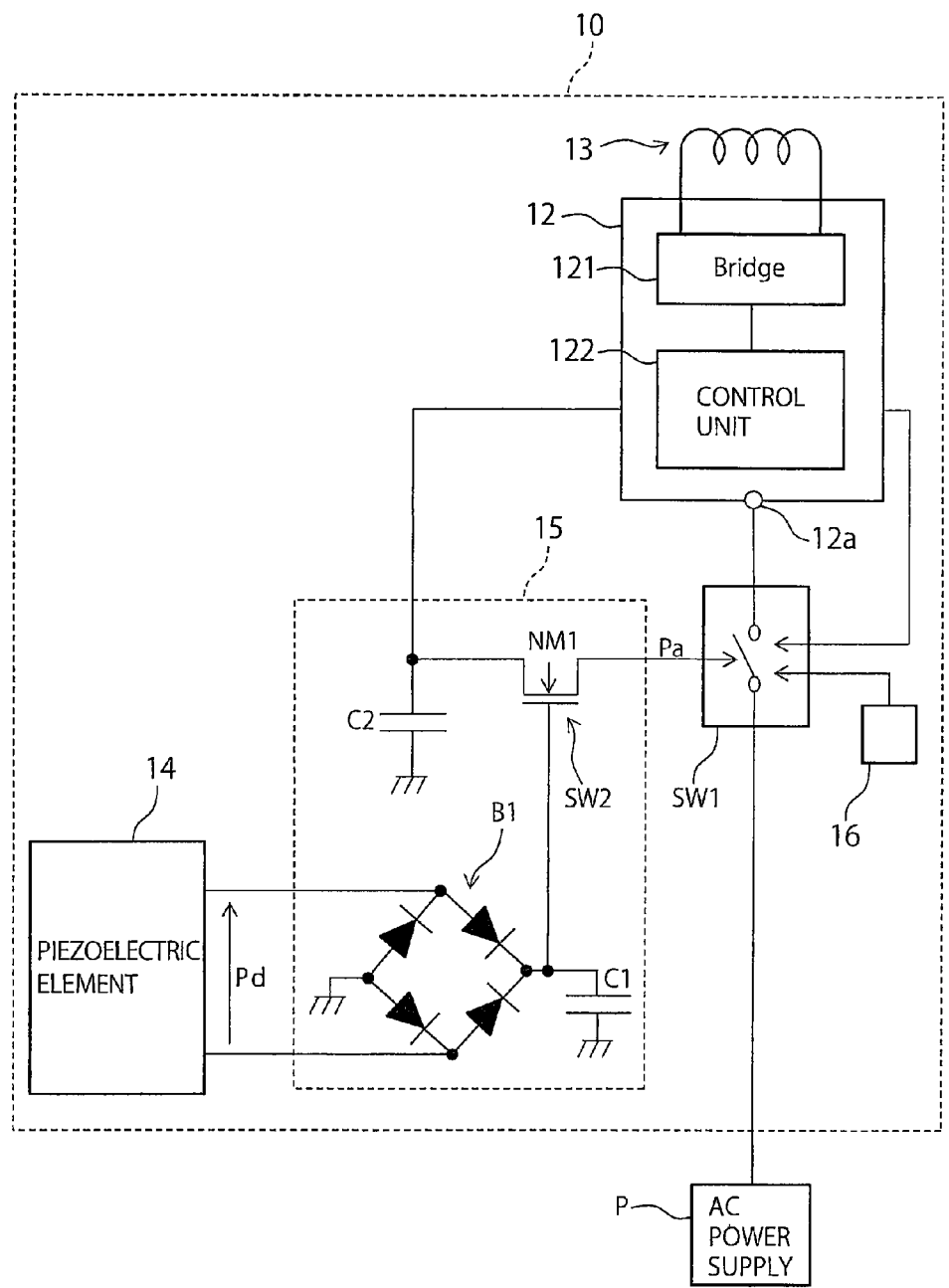
FIG. 2 is a block diagram of the power transmitting device according to an embodiment.

FIG. 2 is a block diagram of the power transmitting device 10 according to an embodiment. As shown in FIG. 2, the power transmitting device 10 includes a power supply unit 12, a power transmitting coil 13, a first switch SW1, a piezoelectric element (a piezo element) 14, a first switch controller 15, and a second switch controller 16. The housing 11 shown in FIG. 1 houses the power supply unit 12, the power transmitting coil 13, the first switch SW1, the piezoelectric element 14, the first switch controller 15, and the second switch controller 16.

The power supply unit 12 includes a power input terminal 12a and generates a transmission power by using AC power supplied to the power input terminal 12a. The power supply unit 12 converts the supplied AC power into DC power and operates by the DC power. The power supply unit 12 includes a bridge circuit 121 such as a full bridge inverter for driving the power transmitting coil 13 and a control unit 122 for controlling the bridge circuit 121 and the power supply unit 12 in compliance with a standard of the Wireless Power Consortium.

The power transmitting coil 13 is housed, for example, below the upper surface 11a of the housing 11 and wirelessly transmits the transmission power generated by the power supply unit 12 to the power receiving device 20.

One end of the first switch SW1 is connected to an external power supply P and the other end thereof is connected to the power input terminal 12a of the power supply unit 12. Once the first switch SW1 is turned on, the first switch SW1 electrically connects the external power supply P and the power input terminal 12a until the first switch SW1 is turned off next time, and once the first switch SW1 is turned off, the first switch SW1 electrically disconnects the external power supply P and the power input terminal 12a until the first switch SW1 is turned on next time. The first switch SW1 is, for example, a toggle switch or a mechanical relay.

In the present embodiment, the external power supply P is a commercial AC power supply. In short, the first switch SW1 switches whether or not the AC power from the external power supply P is supplied to the power supply unit 12. Normally, one end of the first switch SW1 is connected to the external power supply P at all times using a power supply plug (not shown in FIG. 2).

The piezoelectric element 14 is disposed at a position at which the weight of a placed power receiving device 20 can be detected, and generates a detection power Pd according to the weight of the placed power receiving device 20.

For example, a columnar member is provided inside the upper surface 11a of the housing 11 and the piezoelectric element 14 may be disposed at a position at which a pressure is applied by the columnar member when the power receiving device 20 is placed on the upper surface 11a.

The first switch controller 15 generates a starting power Pa by the detection power Pd and switches the first switch SW1 to on by using the starting power Pa. In the present embodiment, the first switch controller 15 includes a bridge diode (a rectifier circuit) B1, a smoothing capacitor (a smoothing circuit) C1, a capacitor element (an electric power storage element) C2, and a second switch SW2.

The bridge diode B1 is a full-wave rectifier circuit including four diodes, which full wave rectifies the detection power Pd generated in the piezoelectric element 14 and outputs rectified power.

The rectified power is supplied to one end of the smoothing capacitor C1 and the ground is connected to the other end of the smoothing capacitor C1. The smoothing capacitor C1 smoothes the rectified power.

One end of the capacitor element C2 is connected to the ground and a power that can switch the first switch SW1 to on can be charged in the capacitor element C2.

One end of the second switch SW2 is connected to the other end of the capacitor element C2. When the smoothed rectified power is supplied to a control terminal of the second switch SW2, the second switch SW2 is turned on to output the power of the capacitor element C2 from the other end thereof as the starting power Pa. When the smoothed rectified power is not supplied to the control terminal, the second switch SW2 is turned off to stop the output of the starting power Pa.

In the present embodiment, the second switch SW2 is an N-type MOS transistor NM1 which includes a source connected to the other end of the capacitor element C2, a gate to which a smoothed rectified power is supplied, and a drain that outputs the starting power Pa.

For example, the second switch controller 16 is provided on a side surface of the housing 11 so that a user can operate the second switch controller 16. The second switch controller 16 switches the first switch SW1 to on according to the operation of the user.

The power supply unit 12 supplies a DC power to the other end of the capacitor element C2 by using the AC power supplied to the power input terminal 12a, so that the power supply unit 12 charges the capacitor element C2.

When the built-in battery has been fully charged, the power receiving device 20 transmits a charge completion signal. When the power supply unit 12 detects the charge completion signal through the power transmitting coil 13, the power supply unit 12 switches the first switch SW1 to off.

Next, the operation of the power transmitting device 10 will be described.

In a standby state where the power receiving device 20 is not placed, the piezoelectric element 14 of the power transmitting device 10 does not generate the detection power Pd. Therefore, the N-type MOS transistor NM1 is turned off. Also, the first switch SW1 is turned off. Thereby, the AC power from the external power supply P is not consumed by the power transmitting device 10, so that the standby power is zero.

When a user places the power receiving device 20 on the upper surface 11a of the housing 11 of the power transmitting device 10 which is in the standby state, a weight (a pressure) is applied to the piezoelectric element 14, so that the piezoelectric element 14 generates the detection power Pd. Thereby, the N-type MOS transistor NM1 is turned on to output the starting power Pa to the first switch SW1. The first switch SW1 is turned on by the starting power Pa and the AC power from the external power supply P is supplied to the power supply unit 12. Thereby, the power supply unit 12 generates the transmission power and the power transmitting coil 13 transmits the transmission power to the power receiving device 20.

The piezoelectric element 14 generates the detection power Pd at an instant when the weight is applied to the piezoelectric element 14 and in a period of time in which the applied weight varies after that. Therefore, generally, it is assumed that the detection power Pd decreases to zero after the user has placed the power receiving device 20 and releases the power receiving device 20 from his or her hand. However, in the present embodiment, once the first switch SW1 which is a toggle switch or the like is turned on by receiving a switch-on control, the first switch SW1 electrically connects the external power supply P and the power input terminal 12a until the first switch SW1 is turned off by receiving a switch-off control independent from the switch-on control, so that the power transmitting device 10 can continuously transmit the transmission power.

Then, the power receiving device 20 charges the built-in battery by using the received power.

As described above, when the built-in battery has been fully charged, the power receiving device 20 transmits a charge completion signal. When the power supply unit 12 detects the charge completion signal through the power transmitting coil 13, the power supply unit 12 switches the first switch SW1 to off. Thereby, when the built-in battery of the placed power receiving device 20 is already fully charged or the charge is completed by using the received power, the power transmitting device 10 becomes the standby state again, so that it is possible to eliminate the standby power.

When the power receiving device 20 is placed, the power supply unit 12 charges the capacitor element C2 by using the supplied AC power. Therefore, the first switch controller 15 can switch the first switch SW1 to on by using the power charged in the capacitor element C2 when the power receiving device 20 is placed next time.

By the way, depending on the condition of the capacitor element C2 such as the capacitance value, there is a possibility that the first switch SW1 cannot be switched to on if the standby state of the power transmitting device 10 continues for a long time and the capacitor element C2 is discharged. In this case, the user may forcibly switch the first switch SW1 to on by operating the second switch controller 16. Thereby, the power transmitting device 10 can recharge the capacitor element C2 as well as transmit the transmission power.

When the user removes the power receiving device 20 being charged from the power transmitting device 10 and places the power receiving device 20 far away from the power transmitting device 10, the power supply unit 12 may detect that the power receiving device 20 is not located nearby by, for example, a method in compliance with a standard of the Wireless Power Consortium, and thereby the power supply unit 12 may switch the first switch SW1 to off. Thereby, the power transmitting device 10 becomes the standby state again. Examples of the methods for detecting the presence of the power receiving device 20 while charging the power receiving device 20 include various methods such as a method in which a PING signal is transmitted by the power supply unit 12 through the power transmitting coil 13 at a certain time interval and the presence or absence of a response from the power receiving device 20 is detected by the power supply unit 12 through the power transmitting coil 13.

As described above, according to the present embodiment, in the standby state in which the power receiving device 20 is not placed, the AC power from the external power supply P is prevented from being supplied to the power supply unit 12 by the first switch SW1 which is in the off state. When the power receiving device 20 is placed, the piezoelectric element 14 generates the detection power Pd, the first switch SW1 is switched to on by using the detection power Pd, and the AC power from the external power supply P is supplied to the power supply unit 12. In this way, the presence of the power receiving device 20 is detected by using the piezoelectric element 14 that does not require standby power, so that it is possible to eliminate the standby power of the power transmitting device 10 when the power receiving device 20 is not present nearby.

Modified Example

It is possible to add various modifications to the above embodiment.

For example, the housing 11 of the power transmitting device 10 may have any shape if the housing 11 includes a placing portion on which the power receiving device 20 can be placed.

Although an example is described in which the rectifier circuit is a full-wave rectifier circuit (the bridge diode B1), for example, the rectifier circuit may be a half-wave rectifier circuit.

Although an example is described in which the electric power storage element is the capacitor element C2, for example, the electric power storage element may be a storage battery. If the storage battery can hold power even when the standby state of the power transmitting device 10 continues for a long time, the second switch controller 16 need not be provided.

Further, although an example is described in which the external power supply P is an AC power supply, the external power supply P may be a DC power supply. In this case, the power supply unit 12 operates by supplied DC power.

An AC adaptor may be included between the external power supply P which is an AC power supply and one end of the first switch SW1 of the power transmitting device 10. Also in this case, in the same manner as in the above embodiment, it is possible to eliminate the standby power of the power transmitting device 10 in the standby state. However, there is the standby power of the AC adaptor itself.

The power transmitting device 10 and the power receiving device 20 need not be in compliance with a standard of the Wireless Power Consortium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power transmitting device on which a power receiving device can be placed, the power receiving device charging a built-in battery by using wirelessly received power, the power transmitting device comprising:
   a power supply unit comprising a power input terminal and configured to generate a transmission power by using power supplied to the power input terminal;
   a power transmitting coil configured to wirelessly transmit the transmission power to the power receiving device;
   a first switch, once the first switch being turned on by receiving a switch-on control, the first switch electrically connecting an external power supply and the power input terminal until the first switch being turned off next time by receiving a switch-off control, and once the first switch being turned off by receiving the switch-off control, the first switch electrically disconnecting the external power supply and the power input terminal until the first switch being turned on next time by receiving the switch-on control;
   a piezoelectric element disposed at a position at which a weight of the placed power receiving device can be detected, and the piezoelectric element configured to generate a detection power according to the weight of the placed power receiving device; and
   a first switch controller configured to generate a starting power by the detection power and switch the first switch to on by using the starting power.

2. The power transmitting device according to claim 1, wherein
   the first switch controller comprises
   a rectifier circuit configured to rectify the detection power and output a rectified power,
   a smoothing circuit configured to smooth the rectified power,
   an electric power storage element which can be charged, and
   a second switch, one end of the second switch being connected to the electric power storage element, the second switch being turned on to output a power of the electric power storage element from the other end of the second switch as the starting power when the smoothed rectified power is supplied to a control terminal of the second switch, and the second switch being turned off to stop outputting the starting power when the smoothed rectified power is not supplied to the control terminal.

3. The power transmitting device according to claim 2, wherein
   the power supply unit charges the electric power storage element by using the power supplied to the power input terminal.

4. The power transmitting device according to claim 2, further comprising:
   a second switch controller configured to switch the first switch to on according to a user's operation.

5. The power transmitting device according to claim 1, wherein the power receiving device transmits a charge completion signal when the built-in battery has been fully charged, and the power supply unit switches the first switch to off when the power supply unit detects the charge completion signal through the power transmitting coil.

6. The power transmitting device according to claim 1, further comprising:

a housing comprising a placing portion on which the power receiving device can be placed, and configured to house the power supply unit, the power transmitting coil, the first switch, the piezoelectric element, and the first switch controller.

7. The power transmitting device according to claim 1, wherein the external power supply is an AC power supply.

8. The power transmitting device according to claim 1, wherein the first switch is a toggle switch or a mechanical relay.

9. The power transmitting device according to claim 2, wherein the rectifier circuit is a full-wave rectifier circuit.

10. The power transmitting device according to claim 2, wherein the rectifier circuit is a half-wave rectifier circuit.

11. The power transmitting device according to claim 2, wherein the smoothing circuit is a smoothing capacitor, the rectified power is supplied to one end of the smoothing capacitor, and the other end of the smoothing capacitor is connected to a ground.

12. The power transmitting device according to claim 2, wherein the electric power storage element is a capacitor element.

13. The power transmitting device according to claim 2, wherein the electric power storage element is a storage battery.

14. The power transmitting device according to claim 2, wherein a power that can switch the first switch to on can be charged in the electric power storage element.

15. The power transmitting device according to claim 2, wherein the second switch is an N-type MOS transistor comprising a source connected to the electric power storage element, a gate to which the smoothed rectified power is supplied, and a drain outputting the starting power.

16. The power transmitting device according to claim 1, wherein the power supply unit comprises a bridge circuit configured to drive the power transmitting coil, and a control unit configured to control the bridge circuit.

17. The power transmitting device according to claim 6, wherein the housing has a flat plate shape, and the placing portion is an upper surface of the housing.

* * * * *